(12) United States Patent
Kimmel

(10) Patent No.: US 9,055,752 B2
(45) Date of Patent: *Jun. 16, 2015

(54) SHELF-STABLE CONCENTRATED DAIRY LIQUIDS AND METHODS OF FORMING THEREOF

(75) Inventor: Jennifer Louise Kimmel, Evanston, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 1590 days.

This patent is subject to a terminal disclaimer.

(21) Appl. No.: 12/266,083

(22) Filed: Nov. 6, 2008

(65) Prior Publication Data

US 2010/0112128 A1    May 6, 2010

(51) Int. Cl.
*A23C 9/00* (2006.01)
*A23C 9/142* (2006.01)
*A23C 1/00* (2006.01)
*A23C 9/152* (2006.01)

(52) U.S. Cl.
CPC .............. *A23C 9/1422* (2013.01); *A23C 9/00* (2013.01); *A23C 1/00* (2013.01); *A23C 9/005* (2013.01); *A23C 9/1522* (2013.01)

(58) Field of Classification Search
CPC ............ A23C 1/00; A23C 9/00; A23C 9/005; A23C 9/1422; A23C 9/1522; A23C 11/04
USPC ........... 426/89, 597, 289, 293, 615, 655, 490, 426/491, 520, 521, 522, 580, 587, 654, 656, 426/657

See application file for complete search history.

(56) References Cited

U.S. PATENT DOCUMENTS

| | | | |
|---|---|---|---|
| 2,334,317 A | 11/1943 | Crighton | |
| 2,860,057 A | 11/1958 | Wilcox | |
| 3,210,201 A | 10/1965 | Tumerman et al. | |
| 3,348,955 A | 10/1967 | Stewart, Jr. | |
| 3,880,755 A | 4/1975 | Thomas et al. | |
| 3,922,375 A | 11/1975 | Dalan et al. | |
| 3,977,967 A | 8/1976 | Trulson et al. | |
| 4,282,262 A | 8/1981 | Blake | |
| 4,529,611 A | 7/1985 | Uiterwaal | |
| 4,698,303 A | 10/1987 | Bailey et al. | |
| 4,876,100 A | 10/1989 | Holm et al. | |
| 4,897,277 A | 1/1990 | Dieu et al. | |
| 4,906,362 A | 3/1990 | Holm et al. | |
| 4,931,185 A | 6/1990 | Bourgeois et al. | |
| 4,931,302 A | 6/1990 | Leshik et al. | |
| 4,956,093 A | 9/1990 | Pirbazari et al. | |
| 4,981,704 A | 1/1991 | Thibault | |
| 5,077,067 A | 12/1991 | Thibault | |
| 5,085,881 A | 2/1992 | Moeller | |
| 5,087,449 A | 2/1992 | Masai et al. | |
| 5,149,647 A | 9/1992 | Burling | |
| 5,152,897 A | 10/1992 | Shibuta et al. | |
| 5,169,666 A | 12/1992 | Woychik | |
| 5,256,437 A | 10/1993 | Degen et al. | |
| 5,260,080 A | 11/1993 | Noel | |
| 5,306,420 A | 4/1994 | Bisconte | |
| 5,338,553 A | 8/1994 | Johnson et al. | |
| 5,344,565 A | 9/1994 | Degen et al. | |
| 5,356,637 A | 10/1994 | Loosen et al. | |
| 5,356,640 A | 10/1994 | Jameson et al. | |
| 5,356,651 A | 10/1994 | Degen et al. | |
| 5,395,636 A | 3/1995 | Degen et al. | |
| 5,420,249 A | 5/1995 | De Wit et al. | |
| 5,427,769 A | 6/1995 | Berrocal et al. | |
| 5,456,843 A | 10/1995 | Koenhen | |
| 5,468,844 A | 11/1995 | Smith | |
| 5,503,729 A | 4/1996 | Elyanow et al. | |
| 5,503,864 A | 4/1996 | Uchida et al. | |
| 5,503,865 A | 4/1996 | Behringer et al. | |
| 5,512,307 A | 4/1996 | Hammond | |
| 5,560,828 A | 10/1996 | Wenten et al. | |
| 5,670,196 A | 9/1997 | Gregory | |
| 5,679,780 A | 10/1997 | Jensen et al. | |
| 5,681,728 A | 10/1997 | Miao | |
| 5,683,733 A | 11/1997 | Krabsen et al. | |

(Continued)

FOREIGN PATENT DOCUMENTS

| | | |
|---|---|---|
| CH | 486 208 A | 2/1970 |
| CN | 101026963 A | 8/2007 |

(Continued)

OTHER PUBLICATIONS

European Patent Office Extended European Search Report for European Application No. 09167573.6 dated May 3, 2011 (14 pages).
Fundamentals of Dairy Chemistry, 3rd Ed., Chapter 2, Composition of Milk Products, p. 43, undated.
H. K. Wilson and E. O. Herreid, Controlling oxidized flavours in high-fat sterilized creams, Journal of Dairy Science, 1969, 52 (8),1229-32, Abstract from Dialog(R) File 51: Food Sci. & Tech. Abs, 1 page.
D. M. Santos et al., Sandiness and other problems in doce de leite, Boletim do Instituto de Tecnologia de Alimentos, 1977, (52), 61-80, Abstract from Dialog(R) File 50: CAB Abstracts, 1 page.
V. R. Harwalkar and H. J. Vreeman, Effect of added phosphates and storage on changes in ultra-high temperature short-time sterilized concentrated skim-milk. 1. Viscosity, gelation, alcohol stability, chemical and electrophoretic analysis of proteins, Netherlands Milk and Dairy Journal, 32 (1978), pp. 94-111.
A. W. Sweetsur and D. D. Muir, The use of permitted additives and heat treatment to optimise the heat stability of skimmed milk and concentrated skim milk, Journal of the Society of Dairy Technology, 1980, 33 (3), 101-5, Abstract from Dialog(R) File 53: Foodline(R): Science, 1 page.

(Continued)

*Primary Examiner* — Leslie Wong

(74) *Attorney, Agent, or Firm* — Fitch, Even, Tabin & Flannery LLP

(57) ABSTRACT

A shelf-stable concentrated dairy product, such as concentrated milk, with improved flavor, color and mouthfeel, and a method of production thereof is provided. The method eliminates any thermal treatment prior to and during concentration that may substantially cross-link casein to whey and preferably utilizes microfiltration to produce a stable concentrated dairy liquid with reduced amounts of whey and lactose. The resulting products have a sterilization value $F_o$ of at least 5 and are also resistant to gelling and browning during high temperature sterilization and also resistant to gelling during extended storage.

18 Claims, 3 Drawing Sheets

(56) References Cited

U.S. PATENT DOCUMENTS

| | | | |
|---|---|---|---|
| 5,683,984 A | 11/1997 | Jost | |
| 5,685,990 A | 11/1997 | Saugmann et al. | |
| 5,691,165 A | 11/1997 | Nielsen et al. | |
| 5,766,666 A | 6/1998 | Streiff et al. | |
| 5,783,237 A | 7/1998 | Sanderson et al. | |
| 5,834,042 A | 11/1998 | Savolainen | |
| 5,844,104 A | 12/1998 | Yanahira et al. | |
| 5,865,899 A | 2/1999 | Theoleyre et al. | |
| 5,902,625 A | 5/1999 | Barz et al. | |
| 5,912,032 A | 6/1999 | Komatsu et al. | |
| 5,925,737 A | 7/1999 | Tomasula et al. | |
| 5,935,632 A | 8/1999 | Larsen | |
| 5,952,207 A | 9/1999 | Gonzalez et al. | |
| 6,010,698 A | 1/2000 | Kussendrager et al. | |
| 6,033,700 A | 3/2000 | Berrocal et al. | |
| 6,060,105 A | 5/2000 | Meister et al. | |
| 6,060,269 A | 5/2000 | Chatterton et al. | |
| 6,071,356 A | 6/2000 | Olsen | |
| 6,103,277 A | 8/2000 | Leufstedt et al. | |
| 6,117,470 A | 9/2000 | Lindquist | |
| 6,120,820 A | 9/2000 | Brody et al. | |
| 6,126,754 A | 10/2000 | Duflot | |
| 6,139,901 A | 10/2000 | Blazey et al. | |
| 6,155,432 A | 12/2000 | Wilson et al. | |
| 6,171,621 B1 | 1/2001 | Braun et al. | |
| 6,177,265 B1 | 1/2001 | Duflot | |
| 6,270,823 B1 | 8/2001 | Jolkin | |
| 6,326,044 B1 | 12/2001 | Lindquist | |
| 6,383,540 B1 | 5/2002 | Noel | |
| 6,390,304 B1 | 5/2002 | Wilson et al. | |
| 6,478,969 B2 | 11/2002 | Brantley et al. | |
| 6,485,762 B1 | 11/2002 | Rizvi et al. | |
| 6,506,305 B2 | 1/2003 | Morita et al. | |
| 6,521,277 B1 | 2/2003 | Mortensen | |
| 6,551,648 B1 | 4/2003 | Goudedranche et al. | |
| 6,555,659 B1 | 4/2003 | Ayers et al. | |
| 6,635,296 B1 | 10/2003 | Nissen et al. | |
| 6,652,898 B2 | 11/2003 | Jensen | |
| 6,716,617 B1 | 4/2004 | Kiy | |
| 6,767,575 B1 | 7/2004 | Huss et al. | |
| 6,787,158 B1 | 9/2004 | Erdmann et al. | |
| 6,800,739 B2 | 10/2004 | Davis et al. | |
| 6,827,960 B2 | 12/2004 | Kopf et al. | |
| 6,866,879 B1 | 3/2005 | Vaarala et al. | |
| 6,887,505 B2 | 5/2005 | Reaves et al. | |
| 6,921,548 B2 | 7/2005 | McCampbell | |
| 7,018,665 B2 | 3/2006 | Ayers et al. | |
| 7,026,004 B2 | 4/2006 | Loh et al. | |
| 7,285,301 B2 | 10/2007 | McCampbell | |
| 2001/0026825 A1 | 10/2001 | Reaves et al. | |
| 2002/0019325 A1 | 2/2002 | Olsen | |
| 2002/0183489 A1 | 12/2002 | Davis et al. | |
| 2003/0038081 A1 | 2/2003 | Wang et al. | |
| 2003/0054068 A1* | 3/2003 | Dybing et al. | 426/34 |
| 2003/0054079 A1 | 3/2003 | Reaves et al. | |
| 2003/0178507 A1 | 9/2003 | Maria Rijn Van | |
| 2004/0009281 A1 | 1/2004 | Green | |
| 2004/0040448 A1 | 3/2004 | Dunker et al. | |
| 2004/0052860 A1 | 3/2004 | Reid et al. | |
| 2004/0062762 A1 | 4/2004 | Mihara et al. | |
| 2004/0067296 A1 | 4/2004 | Loh | |
| 2004/0116679 A1 | 6/2004 | Kønigsfeldt et al. | |
| 2004/0167320 A1 | 8/2004 | Couto et al. | |
| 2004/0188351 A1 | 9/2004 | Thiele et al. | |
| 2004/0213881 A1 | 10/2004 | Chien et al. | |
| 2004/0241791 A1 | 12/2004 | Edens et al. | |
| 2004/0251202 A1 | 12/2004 | Yen et al. | |
| 2005/0061730 A1 | 3/2005 | Moller | |
| 2005/0084874 A1 | 4/2005 | Belfort et al. | |
| 2005/0127001 A1 | 6/2005 | Lindemann et al. | |
| 2005/0170044 A1 | 8/2005 | Lange | |
| 2005/0181092 A1 | 8/2005 | Achs | |
| 2005/0197496 A1 | 9/2005 | Perreault | |
| 2005/0247626 A1 | 11/2005 | Clausse et al. | |
| 2005/0250693 A1 | 11/2005 | Goddard et al. | |
| 2005/0260305 A1 | 11/2005 | Adele et al. | |
| 2005/0260672 A1 | 11/2005 | Couto et al. | |
| 2006/0040025 A1 | 2/2006 | Souppe | |
| 2006/0062873 A1 | 3/2006 | Yee et al. | |
| 2006/0073256 A1 | 4/2006 | Destaillats et al. | |
| 2006/0131236 A1 | 6/2006 | Belfort et al. | |
| 2007/0172548 A1 | 7/2007 | Cale et al. | |

FOREIGN PATENT DOCUMENTS

| | | |
|---|---|---|
| DE | 2 413 193 A1 | 10/1974 |
| EP | 0 056 658 B1 | 4/1989 |
| EP | 0 316 938 A2 | 5/1989 |
| EP | 0 180 599 B1 | 4/1991 |
| EP | 0 334 776 B1 | 7/1991 |
| EP | 0 440 561 A1 | 8/1991 |
| EP | 0 022 019 B2 | 11/1991 |
| EP | 0 491 623 A1 | 6/1992 |
| EP | 0 353 422 B1 | 11/1992 |
| EP | 0 515 318 A1 | 11/1992 |
| EP | 0 542 583 A1 | 5/1993 |
| EP | 0 546 200 A1 | 6/1993 |
| EP | 0 338 950 B1 | 8/1993 |
| EP | 0 329 559 B1 | 6/1994 |
| EP | 0 487 619 B1 | 10/1994 |
| EP | 0 636 319 A2 | 2/1995 |
| EP | 0 469 206 B1 | 3/1996 |
| EP | 0 546 641 B1 | 7/1996 |
| EP | 0 759 272 A1 | 2/1997 |
| EP | 0 788 313 A1 | 8/1997 |
| EP | 0 642 307 B1 | 1/1998 |
| EP | 0 554 818 B1 | 5/1998 |
| EP | 0 712 381 B1 | 1/1999 |
| EP | 0 575 121 B1 | 3/1999 |
| EP | 0 723 400 B1 | 3/2001 |
| EP | 1 158 860 B1 | 6/2002 |
| EP | 1 137 483 B1 | 7/2003 |
| EP | 0 927 042 B1 | 2/2004 |
| EP | 0 936 917 B1 | 2/2004 |
| EP | 1 407 673 A1 | 4/2004 |
| EP | 1 041 161 B1 | 5/2004 |
| EP | 1 133 238 B1 | 7/2004 |
| EP | 1 046 344 B1 | 9/2004 |
| EP | 1 071 341 B1 | 10/2004 |
| EP | 0 542 583 B2 | 10/2005 |
| EP | 1 151 754 B1 | 2/2006 |
| EP | 1 623 717 A1 | 2/2006 |
| EP | 1 307 106 B1 | 3/2006 |
| EP | 1 409 539 B1 | 3/2006 |
| EP | 1 673 975 A1 | 6/2006 |
| EP | 1 311 166 B1 | 9/2006 |
| EP | 1 389 914 B1 | 9/2006 |
| EP | 1 390 126 B1 | 9/2006 |
| EP | 1 613 172 B1 | 6/2007 |
| EP | 1 656 030 B1 | 1/2011 |
| GB | 1 438 533 A | 6/1976 |
| JP | 03-123426 A | 5/1991 |
| JP | 03-143351 A | 6/1991 |
| JP | 03-251143 A | 11/1991 |
| JP | 03-266921 A | 11/1991 |
| JP | 03-278817 A | 12/1991 |
| JP | 04-207157 A | 7/1992 |
| JP | 04-218758 A | 10/1992 |
| JP | 04-299952 A | 10/1992 |
| JP | 05-023072 A | 2/1993 |
| JP | 05-076280 A | 3/1993 |
| JP | 05-269353 A | 10/1993 |
| JP | 05-292880 A | 11/1993 |
| JP | 07-082296 A | 3/1995 |
| JP | 07-285885 A | 10/1995 |
| JP | 08-173031 A | 7/1996 |
| JP | 09-172962 A | 7/1997 |
| JP | 10-056962 A | 3/1998 |
| JP | 10-113122 A | 5/1998 |
| JP | 2000-102344 A | 4/2000 |
| JP | 2001-095487 A | 4/2001 |
| JP | 2002-000291 A | 1/2002 |
| JP | 2004-105048 A | 4/2004 |
| JP | 2004-510445 A | 4/2004 |

(56) References Cited

FOREIGN PATENT DOCUMENTS

| | | |
|---|---|---|
| JP | 2005-185151 A | 7/2005 |
| JP | 2005-245281 A | 9/2005 |
| JP | 2005-269925 A | 10/2005 |
| JP | 2005-336230 A | 12/2005 |
| WO | 87/06797 A1 | 11/1987 |
| WO | 87/07954 A1 | 12/1987 |
| WO | 89/01510 A1 | 2/1989 |
| WO | 89/07154 A1 | 8/1989 |
| WO | 89/11226 A1 | 11/1989 |
| WO | 90/04414 A1 | 5/1990 |
| WO | 90/07545 A2 | 7/1990 |
| WO | 90/07575 A1 | 7/1990 |
| WO | 93/04593 A1 | 3/1993 |
| WO | 93/20713 A1 | 10/1993 |
| WO | 94/13148 A1 | 6/1994 |
| WO | 95/19714 A1 | 7/1995 |
| WO | 96/08155 A1 | 3/1996 |
| WO | 96/35336 A1 | 11/1996 |
| WO | 98/05760 A2 | 2/1998 |
| WO | 98/46732 A1 | 10/1998 |
| WO | 98/48640 A1 | 11/1998 |
| WO | 99/37162 A1 | 7/1999 |
| WO | 00/69548 A1 | 11/2000 |
| WO | 01/01786 A2 | 1/2001 |
| WO | 01/03515 A1 | 1/2001 |
| WO | 01/30168 A1 | 5/2001 |
| WO | 01/41580 A1 | 6/2001 |
| WO | 01/83089 A1 | 11/2001 |
| WO | 02/09527 A2 | 2/2002 |
| WO | 02/19837 A1 | 3/2002 |
| WO | 02/28194 A1 | 4/2002 |
| WO | 02/30210 A1 | 4/2002 |
| WO | 02/43937 A2 | 6/2002 |
| WO | 02/069724 A1 | 9/2002 |
| WO | 03/015902 A2 | 2/2003 |
| WO | 03/090545 A1 | 11/2003 |
| WO | 2004/076695 A1 | 9/2004 |
| WO | 2004/091306 A1 | 10/2004 |
| WO | 2004/094027 A2 | 11/2004 |
| WO | 2004/110158 A1 | 12/2004 |
| WO | 2005/039299 A2 | 5/2005 |
| WO | 2005/078078 A1 | 8/2005 |
| WO | 2006/012506 A1 | 2/2006 |
| WO | 2006/029298 A1 | 3/2006 |
| WO | 2006/043884 A1 | 4/2006 |
| WO | 2006/058083 A2 | 6/2006 |
| WO | 2006/089527 A1 | 8/2006 |
| WO | 2006/091167 A1 | 8/2006 |
| WO | 2006/096073 A1 | 9/2006 |
| WO | 2006/105405 A2 | 10/2006 |
| WO | 2008/077071 A1 | 6/2008 |
| WO | 2008/136671 A1 | 11/2008 |

OTHER PUBLICATIONS

A. W. Maurice Sweetsur and D. Donald Muir, Effect of concentration by ultrafiltration on the heat stability of skim-milk, Journal of Dairy Research, 47, No. 3 (1980), pp. 327-335.
A. W. M. Sweetsur and D. D. Muir, Natural variation in heat stability of concentrated milk before and after homogenization, Journal of the Society of Dairy Techhnology, 1982, vol. 35 (4), 120-126, Abstract from Dialog(R) File 50: CAB Abstracts, 1 page.
A. W. M. Sweetsur and D. D. Muir, Manipulation of the heat stability of homogenised concentrated milk, Journal of the Society of Dairy Technology, 1982, vol. 35 (4), 126-32, Abstract from Dialog(R) File 53: Foodline(R): Science, 1 page.
E. R. B. Graham, The effect of different factors on the viscosity of concentrated milk, XXI International Dairy Congress, 1982, vol. 1, Book 2, p. 45, Abstract from Dialog(R) File 50: CAB Abstracts, 1 page.
D. D. Muir, The influence of some inorganic salts on the heat stability of 40% solids concentrated skim milk, XXI International Dairy Concgress, 1982, vol. 1, Book 2, p. 86, Abstract from Dialog(R) File 50: CAB Abstracts, 1 page.

A. W. M. Sweetsur and D. D. Muir, Optimization of the heat stability of concentrated milks prepared by ultrafiltration, Milchwissenschaft, 40 (6), 1985, pp. 334-337.
J. S. Sindhu, Influence of sodium phosphate on the heat stability of buffalo milk and its concentrate, Journal of Food Processing and Preservation, 1985, 9 (2), 57-64, Abstract from Dialog(R) File 51: Food Sci. & Tech. Abs, 1 page.
J. A. Blais et al., Concentrated milks and milk powder, Presses de L'Universite Laval, 1985, 280-314, Abstract from Dialog(R) File 53: Foodline(R): Science, 1 page.
J. S. Sindhu and M. Tayal, Influence of stabilizers on the salt balance of pH of buffalo milk and its concentrate, Journal of Food Technology, 1986, 21 (3), 331-7, Abstract from Dialog(R) File 53: Foodline(R): Science, 1 page.
J. A. Nieuwenhuijse et al., Calcium and phosphate partitions during the manufacture of sterilized concentrated milk and their relations to the heat stability, Netherlands Milk and Dairy Journal, 1988, 42 (4), 387-421, Abstract from Dialog(R) File 51: Food Sci. & Tech. Abs, 1 page.
Donald J. McMahon et al., Effects of phosphate and citrate on the gelation properties of casein micelles in renneted ultra-high temperature (UHT) sterilized concentrated milk, Food Structure, vol. 10 (1991), pp. 27-36.
N. Venkatachalam and Donald J. McMahon, Effect of lactose concentration on age gelation of UHT sterilized skim milk concentrate, 86 Annual Meeting of American Dairy Science Association, Aug. 12-15, 1991, Champaign, Illinois, Abstract from Journal of Dairy Science 309, p. 101.
J. A. Nieuwenhuijse, Heat stability of concentrated skim milk, Netherlands Milk and Dairy Journal, 1993, 47 (1), 51-53, Abstract from Dialog(R) File 53: Foodline(R): Science, 1 page.
Mohamed Zin El-Din and Takayoshi Aoki, Polymerization of Casein on Heating Milk, Int. Dairy Journal 3 (1993) 581-588.
J. E. Schraml et al., Effects of composition and concentration of dairy liquids on fouling structure, Milchwissenschaft, 1996, 51 (11), 607-611, Abstract from Dialog(R) File 53: Foodline(R): Science, 1 page.
M. E. Cano-Ruiz and R. L. Richter, Changes in Physiochemical Properties of Retort-Sterilized Dairy Beverages During Storage, Journal of Dairy Science, 81 (1998) pp. 2116-2123.
Jay, High-Temperature Food Preservation and Characteristics of Thermophilic Microorganisms, Modern Food Microbiology, Chapter 16, 1998, Aspen Publishers, NY, pp. 347-369.
Athina Tziboula et al., Microfiltration of milk with ceramic membranes: Influence on casein composition and heat stability, Milchwissenschaft, 53 (1) 1998 pp. 8-11.
DeMan, Principles of Food Chemistry, 3rd Ed., 1999, p. 272.
E. Mann, Recombined milk, Dairy Industries International, Feb. 2001, 66 (2), 15-16, Abstract from Dialog(R) File 53: Foodline(R): Science, 1 page.
P. Udabage et al., Effects of Mineral Salts and Calcium Chelating Agents on the Gelation of Renneted Skim Milk, Journal of Dairy Science, 84 (2001), pp. 1569-1575.
N. Datta and H. C. Deeth, Age Gelation of UHT Milk—A Review, Trans IChemE, vol. 79, Part C, Dec. 2001, pp. 197-210.
R. Mizuno and J. A. Lucey, Effects of emulsifying salts on the turbidity and calcium-phosphate-protein interactions in casein micelles, Journal of Dairy Science, Sep. 2005, 88 (9) 3070-3078, Abstract from Dialog(R) File 53: Foodline(R): Science, 1 page.
Japan Patent Office Official Notice of Rejection dated Apr. 28, 2011 for Japanese Patent Application No. 2009-254076, English Translation, 6 pages.
B. K. Nelson and D. M. Barbano, "A Microfiltration Process to Maximize Removal of Serum Proteins from Skim Milk Before Cheese Making," Journal of Dairy Science, vol. 88, No. 5, May 2005, pp. 1891-1900.
G. Solanki and S. S. H. Rizvi, "Physico-Chemical Properties of Skim Milk Retentates from Microfiltration," Journal of Dairy Science, vol. 84, No. 11, Nov. 2001, pp. 2381-2391.
European Patent Office Extended European Search Report dated May 3, 2011 for European Patent Application No. 09252557.5, 10 pages.

(56) References Cited

OTHER PUBLICATIONS

J. Hinrichs et al., Ultrahocherhitzen von Milchkonzentraten, Deutsche Milchwirtschaft, 48 (1997) pp. 185-188, Google Machine English Translation of Summary.

R. Jost and P. Jelen, Cross-flow microfiltration—an extension of membrane processing of milk and whey, Bulletin of the International Dairy Federation, (320), 9-15, 1997 (Abstract, 1 page).

A. Nielsen and J. Sprogo, Powdered whey protein concentrate, Danish Dairy & Food Industry . . . Worldwide, vol. 10, 72-73, 1996 (Abstract, 1 page).

M. Parmentier et al., Process for separation of an anhydrous fat into fractions with high and low melting points and device for implementing this process, French Patent Application FR 2 713 656 A1, p. 13, 1995 (Abstract, 1 page).

M. Britten and Y. Pouliot, Characterization of whey protein isolate obtained from milk microfiltration permeate, Lait, vol. 76 (3), 255-265, 1996 (Abstract, 1 page).

R. K. Singh and S. S. H. Rizvi, Bioseparation processes in foods, Conference Proceedings ITF Basic Symposium Series 10, pp. viii and 469, 1995, Marcel Dekker Inc., New York, New York (Abstract, 1 page).

D. Karleskind et al., Chemical pretreatment and microfiltration for making delipidized whey protein concentrate, Journal of Food Science, vol. 60 (2), 221-226, 1995 (Abstract, 1 page).

D. Karleskind et al., Gelation properties of lipid-reduced, and calcium-reduced whey protein concentrates, Journal of Food Science, vol. 60 (4), 731-737 and 741, 1995 (Abstract, 1 page).

K. H. Mohr and R. Schulze, Membrane separation processes in food engineering and biotechnology. II., Lebensmittelindustrie (Berlin), vol. 35 (6), 244-249, 1988 (Abstract, 1 page).

J. C. Rinn et al., Evaluation of nine semi-pilot scale whey pretreatment modifications for producing whey protein concentrate, Journal of Food Science, vol. 55 (2), 510-515, 1990 (Abstract, 1 page).

M. Girones I Nogue et al., Vibrating polymeric microsieves: antifouling strategies for microfiltration, Journal of Membrane Science, 285 (1, 2), 323-333, 2006 (Abstract, 1 page).

J. Kromkamp et al., Differential analysis of deposition layers from micellar casein and milk fat globule suspensions onto ultrafiltration and microfiltration membranes, Journal of Food Engineering, 80 (1), 257-266, 2007 (Abstract, 1 page).

M. C. Michalski et al., Microfiltration of raw whole milk to select fractions with different fat globule size distributions: process optimization and analysis, Journal of Dairy Science, 89 (10), 3778-3790, 2006 (Abstract, 1 page).

P. Morin et al., A comparative study of the fractionation of regular buttermilk and whey buttermilk by microfiltration, Journal of Food Engineering, 77 (3, Special Section: CHISA 2004), 379-471, 2006 (Abstract, 1 page).

I. Drgalic and L. Tratnik, Application and effects of microfiltration in the dairy industry, Mljekarstvo, 54 (3), 225-245, 2004 (Abstract, 1 page).

R. R. Roesch, et al., Emulsifying properties of fractions prepared from commercial buttermilk by microfiltration, Journal of Dairy Science, 87 (12), 4080-4087, 2004 (Abstract, 1 page).

Kentish Vivekanand et al., Microfiltration offers environmentally friendly fractionation of milk proteins, Australian Journal of Dairy Technology, 59 (2), 186-188, 2004 (Abstract, 1 page).

P. Blanpain-Avet et al., The effect of multiple fouling and cleaning cycles on a tubular ceramic microfiltration membrane fouled with a whey protein concentrate. Membrane performance and cleaning efficiency, Food & Bioproducts Processing, 82 (C3), 231-243, 2004 (Abstract, 1 page).

D. M. Krstic et al., Static turbulence promoter in cross-flow microfiltration of skim milk, Desalination, 163 (1, 2, 3), 297-309, 2004 (Abstract, 1 page).

M. Corredig et al., Production of a novel ingredient from buttermilk, Journal of Dairy Science, 86 (9), 2744-2750, 2003 (Abstract, 1 page).

V. Mahesh Kumar and S. V. Anand, Potential applications of microfiltration in the dairy industry, Indian Food Industry, 22 (3), 58-62, 2003 (Abstract, 1 page).

J. C. Astaire et al., Concentration of polar MFGM lipids from buttermilk by microfiltration and supercritical fluid extraction, Journal of Dairy Science, 86 (7), 2297-2307, 2003 (Abstract, 1 page).

J. L. Maubois, Membrane microfiltration: a tool for a new approach in dairy technology, Australian Journal of Dairy Technology, 57 (2), 92-96, 2002 (Abstract, 1 page).

P. K. Vadi and S. S. H. Rizvi, Experimental evaluation of a uniform transmembrane pressure crossflow microfiltration unit for the concentration of micellar casein from skim milk, Journal of Membrane Science, 189 (1), 69-82, 2001 (Abstract, 1 page).

M. R. Bird and M. Bartlett, Measuring and modelling flux recovery during the chemical cleaning of MF membranes for the processing of whey protein concentrate, Journal of Food Engineering, 53 (2), 143-152, 2002 (Abstract, 1 page).

G. Solanki and S. S. H. Rizvi, Physico-chemical properties of skim milk retentates from microfiltration, Journal of Dairy Science, 84 (11), 2381-2391, 2001 (Abstract, 1 page).

T. Ishii et al., The liquid-state 31P-nuclear magnetic resonance study on microfiltrated milk, Journal of Dairy Science, 84 (11), 2357-2363, 2001 (Abstract, 1 page).

Chaturvedi Saumya et al., Studies on microfiltration as a method of de-lipidization of whey for production of whey protein concentrate, Journal of Food Science & Technology, India, 38 (2), 161-164, 2001 (Abstract, 1 page).

Tia—Techniques Industrielles Appliquees, Recent developments and applications in membrane processes, Industries Alimentaires et Agricoles, 117 (4), 19-22, 2000 (Abstract, 1 page).

L. V. Saboya and J. L. Maubois, Current developments of microfiltration technology in the dairy industry, Lait, 80 (6), 541-553, 2000 (Abstract, 1 page).

T. Bacher and P. Konigsfeldt, WPI by microfiltration of skim milk, European Dairy Magazine, 5, 14-16, 2000 (Abstract, 1 page).

Min Wang et al., The preliminary experiment of microfiltration for the removal of microorganisms in raw milk, China Dairy Industry, 28 (2), 13-14, 2000 (Abstract, 1 page).

D. L. Hekken and V. H. Van Holsinger, Use of cold microfiltration to produce unique beta-casein enriched milk gels, Lait, 80 (1), 69-76, 2000 (Abstract, 1 page).

G. Gesan-Guiziou et al., Critical stability conditions in skimmed milk crossflow microfiltration: impact on operating modes, Lait, 80 (1), 129-138, 2000 (Abstract, 1 page).

H. Goudedranche et al., Fractionation of globular milk fat by membrane microfiltration, Lait, 80 (1), 93-98, 2000 (Abstract, 1 page).

U. Huelsen, Alternative heat treatment processes, European Dairy Magazine, 3, 20-24, 1999 (Abstract, 1 page).

A. Makardij et al., Microfiltration and ultrafiltration of milk: some aspects of fouling and cleaning, Food & Bioproducts Processing, 77 (C2), 107-113, 1999 (Abstract, 1 page).

G. Gesan-Guiziou et al., Critical stability conditions in crossflow filtration of skimmed milk: transition to irreversible depostion, Journal of Membrane Science, 158 (1, 2), 211-222, 1999 (Abstract, 1 page).

G. Gesan-Guiziou et al., Wall shear stress: effective parameter for the characterisation of the cross-flow transport in turbulent regime during skimmed milk microfiltration, Lait, 79 (3), 347-354, 1999 (Abstract, 1 page).

O. Le Berre and G. Daufin, Microfiltration (0.1 mum) of milk: effect of protein size and charge, Journal of Dairy Research, 65 (3), 443-455, 1998 (Abstract, 1 page).

A. Guerra et al., Low cross-flow velocity microfiltration of skim milk for removal of bacterial spores, International Dairy Journal, 7 (12), 849-861, 1997 (Abstract, 1 page).

J. L. Maubois, Current uses and future perspectives of MF technology in the dairy industry, Bulletin of the International Dairy Federation, 320, 37-40, 1997 (Abstract, 1 page).

P. M. Kelly and J. J. Tuohy, The effectiveness of microfiltration for the removal of microorganisms, Bulletin of the International Dairy Federation, 320, 26-31, 1997 (Abstract, 1 page).

S. Sachdeva and W. Buchheim, Separation of native casein and whey proteins during crossflow microfiltration of skim milk, Australian Journal of Dairy Technology, 52 (2), 92-97, 1997 (Abstract, 1 page).

(56) References Cited

OTHER PUBLICATIONS

G. Samuelsson et al., Rennet coagulation of heat-treated retentate from crossflow microfiltration of skim milk, Milchwissenschaft, 52, (4), 187-192, 1997 (Abstract, 1 page).

W. Hoffmann et al., Use of microfiltration for the production of pasteurized milk with extended shelf life, Bulletin of the International Dairy Federation, 311, 45-46, 1996 (Abstract, 1 page).

I. Pafylias et al., Microfiltration of milk with ceramic membranes, Food Research International, 29 (2), 141-146, 1996 (Abstract, 1 page).

M. Pouliot et al., On the conventional cross-flow microfiltration of skim milk for the production of native phosphocaseinate, International Dairy Journal, 6 (1), 105-111, 1996 (Abstract, 1 page).

Y. S. Liu et al., Fractionation of skim milk by ceramic membranes. III. Separation of whey proteins and evaluation of their functionality, Journal of Dairy Science, 78 (1), 148, 1995 (Abstract, 1 page).

S. Singh et al., Fractionation of skim milk by ceramic membranes. II. Separation of caseins and evaluation of their functional properties, Journal of Dairy Science, 78 (1), 147, 1995 (Abstract, 1 page).

F. Sanchez-Diaz Lozano et al., Fractionation of skim milk by ceramic membranes. I. Separation of fat, Journal of Dairy Science, 78 (1), 147, 1995 (Abstract, 1 page).

G. Gesan et al., Microfiltration performance: physicochemical aspects of whey pretreatment, Journal of Dairy Research, 62 (2), 269-279, 1995 (Abstract, 1 page).

G. Gesan et al., Performance of an industrial cross-flow microfiltration plant for clarifying rennet whey, Netherlands Milk & Dairy Journal, 47 (3, 4), 121-135, 1993 (Abstract, 1 page).

A. Pierre et al., Whey microfiltration performance: influence of protein concentration by ultrafiltration and of physicochemical pretreatment, Lait, 74 (1), 65-77, 1994 (Abstract, 1 page).

Anonymous, Mechanical methods for reducing the number of microorganisms in milk: bactofugation and microfiltration, Revista Argentina de Lactologia, 4 (6), 65-68, 1992 (Abstract, 1 page).

C. V. Morr, Whey protein functionality: current status and the need for improved quality and functionality, Food Technology, 44 (4), 100, 102-104, 106, 108, 110, 112, 1990 (Abstract, 1 page).

R. Haeusl et al., Crossflow microfiltration in the dairy industry, Lebensmitteltechnik, 22 (11), 652-656, 658-661, 1990 (Abstract, 1 page).

N. Olesen and F. Jensen, Microfiltration. The influence of operation parameters on the process, Milchwissenschaft, 44 (8), 476-479, 1989 (Abstract, 1 page).

P. R. Heinemann, The problem of fouling in crossflow microfiltration, Dissertation Abstracts International, B. 49 (2), 1988 (Abstract, 1 page).

J. Fauquant et al., Microfiltration of milk using a mineral membrane, Technique Laitiere & Marketing, 1028, 21-23, 1988 (Abstract, 1 page).

\* cited by examiner

SHELF-STABLE CONCENTRATED DAIRY LIQUIDS AND METHODS OF FORMING THEREOF

FIELD

The field relates to concentrated dairy liquids and method of formation thereof. More specifically, the field relates to non-gelling, non-browning, organoleptically pleasing, concentrated dairy liquids, such as concentrated milk, having depleted levels of whey protein and lactose.

BACKGROUND

Liquid dairy products, such as milk, may be thermally processed to increase their stability. Unfortunately, thermally treating milk often results in color changes and/or gelation during processing or extended storage. For example, lactose in milk heated to high temperatures tends to interact with proteins and results in an unsightly brown color. This undesired condition is often referred to as browning or a browning or Mallaird reaction. Gelation, on the other hand, is not completely understood, but the literature suggests that gels may form, under certain conditions, as a three-dimensional protein matrix formed by the whey and casein proteins. See, e.g., Datta et al., "Age Gelation of UHT Milk—A Review," Trans. IChemE, Vol. 79, Part C, 197-210 (2001). Both gelation and browning are undesirable in milk since they impart objectionable organoleptic properties.

The concentration of milk is often desired because it allows for smaller quantities to be stored and transported, thereby resulting in decreased storage and shipping costs, and may allow for the packaging and use of milk in more efficient ways. However, the production of an organoleptically-pleasing, highly concentrated milk can be difficult, because the concentration of milk generates even more pronounced problems with gelation and browning. For instance, milk that has been concentrated at least three-fold (3×) has an even greater tendency to undergo protein gelation and browning during its thermal processing. Additionally, such concentrated milk also has a greater tendency to separate and form gels over time as the product ages, thereby limiting the usable shelf life of the product. Concentrated milk, as a result, is generally limited to concentrations below about 25 percent total solids, protein levels below about 7 percent, and a shelf life of less than six months.

A typical method of producing concentrated milk involves multiple heating steps in combination with the concentration of the milk. For example, one general method used to produce concentrated milk involves first standardizing the milk to a desired ratio of solids to fat and then forewarming the milk to reduce the risk of the milk casein from coagulating during later sterilization. In that method, forewarming also decreases the risk of coagulation taking place during storage prior to sterilization and may further decrease the initial microbial load. The forewarmed milk is then concentrated by evaporation, ultrafiltration, or other appropriate methods to the desired concentration. The milk may be homogenized, cooled, restandardized, and packaged. In addition, a stabilizer salt may be added to help reduce the risk of coagulation of the milk that may occur at high temperatures or during storage. Either before or after packaging, the product is sterilized. Sterilization usually involves either relatively low temperatures for relatively long periods of time (e.g., about 90 to about 120° C. for about 5 to about 30 minutes) or relatively high temperatures for relatively short periods of time (e.g., about 135° C. or higher for a few seconds).

Various approaches for the production of concentrated milk have been documented. For example, Wilcox, U.S. Pat. No. 2,860,057, discloses a method to produce a concentrated milk using forewarming, pasteurizing, and high-temperature, short-term sterilization after concentration. Wilcox teaches the concentration of milk to approximately 26 percent solids using forewarming at about 115° C. (240° F.) for about 2 minutes prior to concentration, preheating at 93° C. (200° F.) for about 5 minutes after concentration, and sterilization at about 127 to 132° C. (261 to 270° F.) for 1 to 3 minutes.

U.S. Patent Publication US 2003/0054079 A1 (Mar. 20, 2003) to Reaves discloses a method of producing an ultra-high temperature milk concentrate having 30 to 45 percent nonfat milk solids. Reaves discloses the preheating of milk for 10 minutes at 65° C. (150° F.) to produce a preheated, milk starting product, which is then pasteurized at 82° C. (180° F.) for 16 to 22 seconds and evaporated under elevated pasteurizing temperatures (i.e., 10 minutes at 62° C. (145° F.) under vacuum) to produce an intermediate, condensed liquid milk. A cream and stabilizer, such as sodium hexametaphosphate or carrageenan, are added to the intermediate milk, which is then ultrapasteurized in two stages wherein the first stage is at 82° C. (180° F.) for 30 to 36 seconds and second stage is at 143° C. (290° F.) for 4 seconds. Shelf lives of 30 days to six months are reported for the resulting milk concentrate.

U.S. Patent Publication US 2007/0172548 A1 (Jul. 26, 2007) to Cale discloses a method to produce a heat-stable concentrated milk product by first forewarming a dairy liquid at a temperature of about at least about 60° C. for a time sufficient to effect a reduction of pH 4.6 soluble proteins. At low forewarming temperatures at about 60° C., Cale describes forewarming times of several hours. At higher temperatures, Cale describes lower times. For example, forewarming between about 70° C. and about 100° C. is described as requiring about 0.5 to about 20 minutes. Further concentration is then carried out by ultrafiltration either with or without diafiltration resulting in an intermediate dairy liquid having at least about 8.5 percent total protein. Stabilizers and mouthfeel enhancers are then added to the intermediate dairy liquid prior to sterilization. This composition is resistant to gelation and browning during sterilization and resistant to gelation and browning for at least about six months under ambient conditions.

As described in Cale, it is commonly believed that forewarming is a necessary process step in order to achieve the extended shelf-life of dairy concentrates. Cale describes that when an untreated dairy product (having both casein and whey proteins) is exposed to heat treatment, such as forewarming, it is believed that the whey proteins crosslink with the casein proteins (i.e., the κ-casein) present on the outer surface of casein micelles in the milk. Cale explains that such crosslinking accomplishes at least two effects. First, the interaction removes many of the whey proteins from solution, which is described as being important because whey protein can be very reactive at high temperatures, such as those experienced in sterilization. Secondly, as the casein micelles become coated with the serum or whey proteins, casein-casein interactions can be reduced or minimized, which is described as likely reducing the tendency of thermally induced milk gels to form.

Other types of concentration techniques for milk are known, but each technique generally has limited success in achieving shelf-stable or organoleptic pleasing concentrates. For example, Tziboula et al., "Microfiltration of milk with ceramic membranes: Influence on casein composition and heat stability," *Milchwissenschaft,* 53(1):8-11, 1998 describes materials and methods directed to microfiltration of skim milk. Tziboula describes that the microfiltration of milk produces a retentate having both casein and whey, but also indicates that the whey in the retentate and permeate are in the same amounts. Tziboula concludes, however, the resultant retentates are generally less resistant to heat treatment as compared to the permeate or the starting milk source. Tziboula makes no provision for removing lactose from the retentates.

SUMMARY

The present process relates to methods of forming stable concentrated dairy liquids, such as concentrated milk, having amounts of casein protein and reduced amounts of whey protein, lactose, and minerals. In one aspect of the methods, forewarming or other heating of the starting dairy liquid is eliminated and/or the temperature exposure of the starting dairy liquids prior to and during concentration is generally maintained below levels configured to minimize and, preferably, eliminate any cross-linking between the casein and whey proteins. In another aspect, concentration techniques are then used that deplete both the amount of whey protein and lactose in the concentrate. As a result, sufficient amounts of whey protein are removed from the concentrate prior to a final sterilization step, which minimizes and, preferably, eliminates cross-linking between any remaining whey protein and casein protein in the final beverage due to such low levels of whey being exposed to the increased sterilization temperatures. It is believed that such whey and lactose depletion and the pre-concentration temperature management are related to an improvement in shelf-stability over prior dairy concentrates to at least about 9 months and, preferably, at least about 12 months or greater in the final concentrated beverage.

The pre-concentration temperature management combined with the whey and lactose depletion methods herein provide advantages over prior concentration methods because it is believed that while cross-linking of the whey and casein proteins achieved in prior methods may provide an initial stability to the concentrate, these cross-links appear to degrade over time under some circumstances and eventually result in the concentrates becoming unstable after several months of shelf storage. For instance, after a length of shelf life, it is now believed that the prior crosslinking between the whey and κ-casein in prior concentrates subjected to forewarming may weaken, and the whey-casein micelle structure may deteriorate under some conditions. Not wishing to be limited by theory, over time, it is believed that the cross-linked whey can dissociate from the casein micelle, and at the same time remove the κ-casein molecule from the casein micelle with it. When such separation occurs, it is further believed that once the κ-casein is no longer present or present in reduced amounts on the outer surface of the casein micelle, the casein micelles then tend to have an increased likelihood to interact with other casein micelles, which may result in phase separation and/or gelling after extended periods of storage.

In the new methods herein, the stable concentrated dairy liquids are formed by first providing a dairy liquid base containing lactose, casein proteins, and whey proteins. Next, the dairy liquid base is concentrated, such as with microfiltration techniques, in a process configured to concentrate casein protein and deplete whey protein, lactose, and minerals from the dairy liquid base to generally form a whey and lactose depleted concentrated dairy liquid retentate. Preferably, the retentate from the microfiltration step has at least about 13 to about 17 percent total protein and a reduced amount of lactose and whey proteins relative to the starting dairy source. In general, there is no forewarming or other heat treatment step for the dairy liquid base prior to concentration and the temperatures during and prior to microfiltration are maintained below exposure times and temperatures in which the whey would tend to cross-link to the casein. By one approach, for example, the temperatures of the dairy liquid base prior to and during microfiltration are maintained below about 90° C., preferably, below about 70° C. and, in some cases, below about 55° C.

Following microfiltration, effective amounts of a stabilizer and a mouthfeel enhancer can be added to the whey and lactose depleted concentrated dairy liquid retentate to form an intermediate concentrated dairy liquid. The intermediate concentrated dairy liquid can then be sterilized at a time and temperature sufficient to obtain the resultant stable concentrated dairy liquid having a $F_o$ of at least about 5. Because the intermediate concentrated dairy liquid has had its temperature managed before whey was depleted and exposed to increased temperatures only after whey depletion, the intermediate concentrated dairy liquid is generally resistant to gelation during sterilization and the resultant stable concentrated dairy liquid is resistant to gelation for at least about 9 months (preferably, at least about 12 months) of storage under ambient conditions.

Generally, the resultant stable concentrated dairy liquid has a total solids from about 25 to about 30 percent (preferably, about 28 to about 30 percent) and includes about 9 to about 13 percent total protein (the concentrate preferably includes about 8 to about 12 percent casein protein and about 1 percent or less whey protein) and generally less than about 1 percent lactose. The composition of the total protein in the resulting stable concentrated dairy liquid includes at least about 90 percent casein protein and less than about 10 percent whey protein (preferably at least about 95 percent casein protein and less than about 5 percent whey protein). In other words, a resulting ratio of casein proteins to whey proteins in the final concentrates is, in some cases, at least about 90:10 and, in other cases, at least about 95:5. This ratio is in contrast to casein to whey ratios of about 80:20 in the starting dairy source and in prior concentrates that do not deplete whey.

The resultant stable concentrated dairy liquid of the methods described herein may also include other components, including stabilizers and/or mouthfeel enhancers. For example, the stable concentrated dairy liquid may include about 0.2 to about 0.4 percent of a stabilizer (preferably, about 0.25 to about 0.33 percent). The stable concentrated dairy liquid may also contain about 0.4 to about 0.6 percent of a mouthfeel enhancer. Finally, it is contemplated that the stable concentrated dairy liquid may also contain about 4.5 to about 6 percent of a sweetener, such as sugar.

By another approach, the methods disclosed herein also provide that the resultant stable concentrated dairy liquids may include a blend of ultrafiltered and forewarmed dairy liquids combined with dairy liquids concentrated per the whey and lactose depleted methods described above. For example, a second starting dairy liquid may be provided having casein proteins and whey proteins, forewarmed at times and temperatures sufficient to cross-link whey and casein, and then concentrated using ultrafiltration techniques to form a second concentrated dairy liquid retentate. The second concentrated dairy liquid retentate may have an increased amount of both casein proteins and whey proteins relative to the second starting dairy liquid. By one approach, the second concentrated dairy liquid may have a protein composition of about 80 to about 83 percent casein protein and about 17 to about 20 percent whey protein and at least about 70 percent of the whey protein cross-linked to the casein protein. The second concentrated dairy liquid retentate may then be blended with the whey and lactose depleted concentrated dairy liquid retentate from above to form concentrates having varying amounts of whey and casein proteins and varying amounts of cross-linked whey and casein.

DETAILED DESCRIPTION

Figure 1:
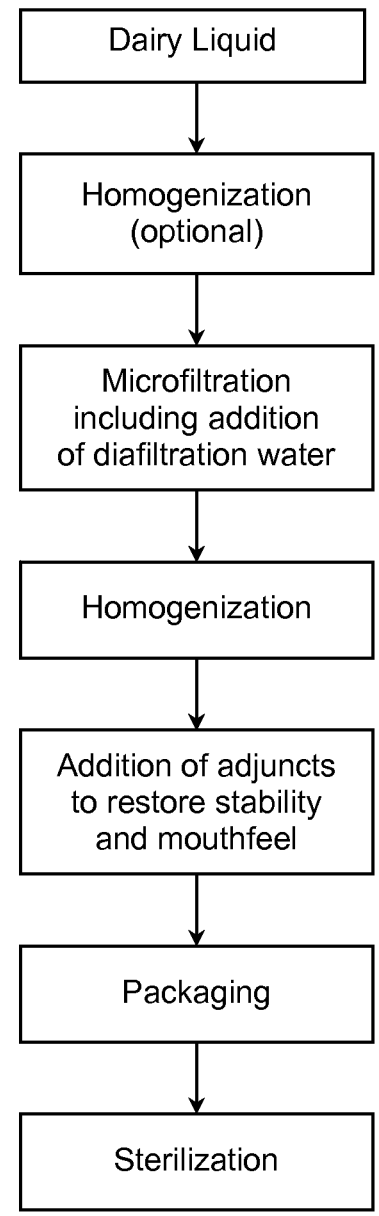
FIG. 1 provides a flowchart illustrating a general method of concentrating a dairy liquid.

In general, methods are provided to prepare shelf-stable concentrated dairy liquids with reduced amounts of whey and lactose obtained in the absence of forewarming or other pre-concentration heat treatments. In one aspect, the methods first limit the temperature exposure of the starting dairy liquid source prior to and during concentration to temperatures and exposure times below which whey will tend to crosslink with casein. In another aspect, the methods then employ concentration techniques that deplete whey, lactose, and minerals prior to exposing the concentrated dairy liquids to increased temperatures. As a result, by first managing the temperature and/or exposure time that the whey-containing dairy liquid is exposed to prior to and during concentration, it is believed that cross-linking between whey and casein proteins can be reduced or, in some cases, eliminated. Then, by employing concentration techniques that deplete the amount of whey and lactose in the concentrate prior to exposing the liquids to increased and/or sterilization temperatures there is less whey (if any) to cross-link to the casein in the final product when subjected to high temperatures. As a result, it is believed that such whey and lactose depletion combined with the pre-concentration temperature management procedures are related to an improvement in shelf-stability to at least about 9 months and, preferably, greater than 12 months in the final concentrated beverage.

By one approach, the process first limits the thermal exposure of the starting dairy liquid prior to and during concentration to temperatures and times below those that tended to cross-link the whey proteins to the κ-casein proteins in casein micelles of the prior concentrates. As noted in the background, it was previously believed that such cross-linking was necessary to achieve an extended shelf-life in concentrated dairy beverages. The methods herein eliminate such cross-linking and heating steps. For example, the methods herein generally maintain the temperatures and exposure times of the starting dairy liquid prior to and during concentration to about 90° C. or less and, in some cases, below about 70° C. or less, and in other cases, below about 55° C. so that the dairy liquid has substantially no or minimal cross-linking between the casein and whey prior to whey depletion during concentration. As discussed in more detail below, the amount of cross-linking between the casein and whey can be measured by the amount of pH 4.6 soluble proteins in the liquid. For purposes herein, substantially no or minimal cross-linking between the casein and whey means at least about 90 percent or greater pH 4.6 soluble proteins in the dairy liquid prior to concentration.

By another approach, the dairy liquid is then concentrated using concentration techniques, such as microfiltration techniques, to concentrate casein protein and deplete levels of whey protein, lactose and other minerals, with or without diafiltration, to create a whey and lactose depleted concentrated dairy liquid retentate having a ratio of casein to whey of at least about 90:10 and, preferably, at least about 95:5. Next, effective amounts of stabilizers and mouthfeel enhancers may then be added to the whey and lactose depleted concentrated dairy liquid retentate prior to sterilization to create an intermediate concentrated dairy liquid having a composition that is resistant to gelation and browning during sterilization. The intermediate concentrated dairy liquid is then sterilized using sterilization techniques to achieve a stable concentrated dairy liquid having a sterilization value $F_o$ of at least about 5 (preferably at least about 6.5 and more preferably at least about 7.5). The resultant stable concentrated dairy liquid is resistant to gelation and browning for at least about 9 months, preferably about 12 months, of storage under ambient conditions.

More specifically, the stable and organoleptically-pleasing dairy liquid is formed through a multi-step process to achieve a desired sterilization value and product stability characteristics. FIG. 1 illustrates an exemplary general method of producing the stable concentrated dairy liquid. First, a starting dairy liquid or dairy liquid base is optionally homogenized. Next, the starting dairy liquid is concentrated to the desired level to form a whey and lactose depleted concentrated dairy liquid retentate. Prior to and during concentration, there is preferably no forewarming or other thermal treatments that would tend to substantially form cross-links between the casein and whey proteins in the starting dairy liquid. Generally the concentration (prior to addbacks) is to a total solids content of about 24 to about 25 percent using microfiltration-type techniques alone or combined with diafiltration techniques to also deplete the whey, lactose, and minerals. If microfiltration is combined with diafiltration, the diafiltration should be carried during or after microfiltration. After the concentration step, the whey and lactose depleted concentrated dairy liquid retentate is then homogenized. Effective amounts of adjuncts, such as a stabilizer and a mouthfeel enhancer, may then be added to the homogenized concentrated dairy liquid. The final stable concentrated dairy liquid, which preferably has greater than about 9 percent total protein (most preferably, about 12 to about 13 percent protein), is then packaged and sterilized to a $F_o$ greater than 5 to provide the stable concentrated dairy liquid.

Figure 2:
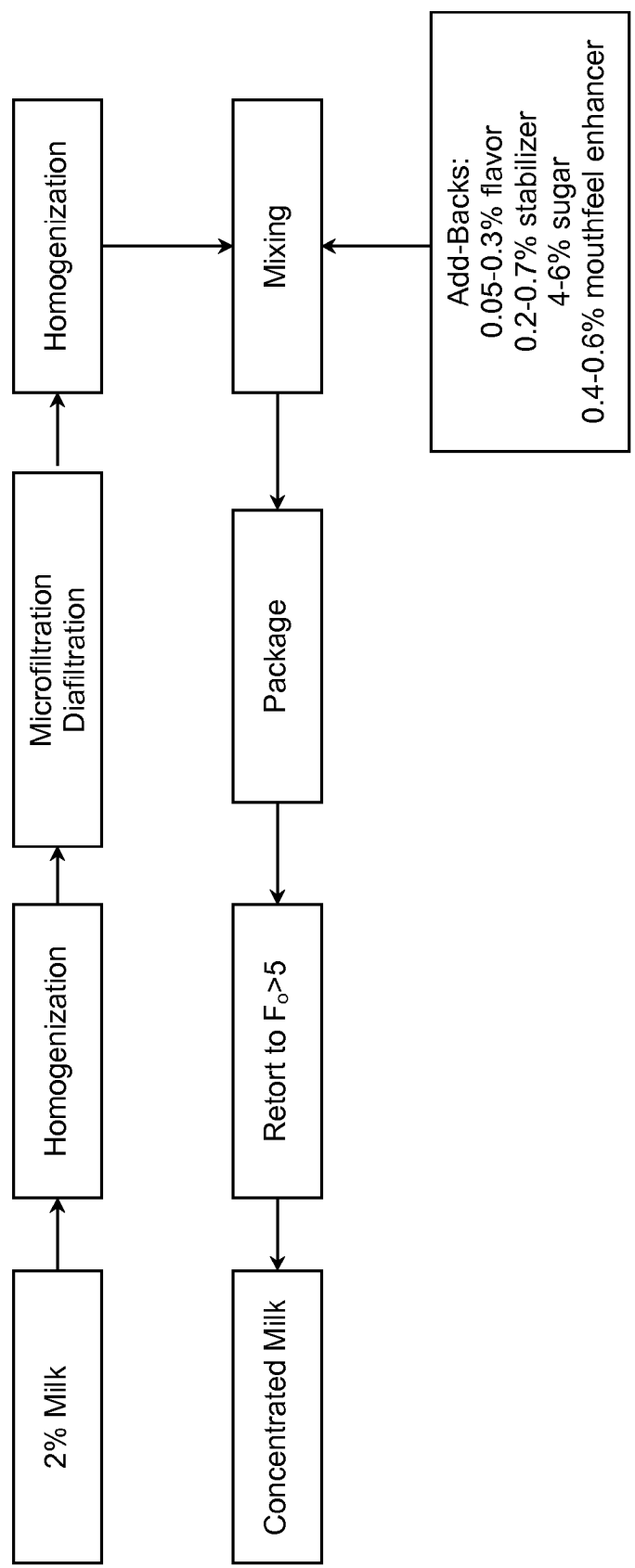
FIG. 2 provides a flowchart illustrating a preferred method of concentrating a dairy liquid.

FIG. 2 illustrates one example of a more preferred embodiment to produce the stable concentrated dairy liquid. First, two-percent milk is homogenized and then concentrated using microfiltration techniques with diafiltration to achieve a whey and lactose depleted concentrated dairy liquid retentate having a target composition (before addbacks) with at least about 16 to about 17 percent total protein, about 13 to about 14 percent fat, less than about 1 percent lactose, and about 24 to about 25 percent total solids. The whey and lactose depleted concentrated dairy liquid retentate also generally has a total protein content containing about at least about 90 percent casein (about 93 to about 95 percent casein) and less than about 10 percent whey (less than about 5 to about 7 percent whey).

Prior to concentration, there is no forewarming step or other thermal treatment of the two-percent milk that would tend to cross-link the whey and casein. The 2% milk is generally maintained at a temperature prior to and during concentration of about 90° C. or less, preferably about 70° C. or less, and most preferably about 55° C. or less at exposure times to minimize and, preferably, eliminate such cross-linking. After concentration, the formed whey and lactose depleted concentrated dairy liquid retentate may then be homogenized.

Next, adjuncts or addbacks may be blended into the retentate. By one approach, the addbacks may include at least one stabilizer (e.g., about 0.2 to about 0.4 percent trisodium citrate or disodium phosphate), at least one mouthfeel enhancer (e.g., about 0.2 to about 0.6 percent sodium chloride), and optional additives (e.g., about 0.01 to about 0.02 percent flavor and about 4 to about 6 percent sweetener).

The resulting product is then packaged and sterilized (e.g., retorted) to achieve a $F_o$ of at least 5 and to provide the resultant stable concentrated dairy liquid. By one approach, the final or resultant stable concentrated dairy liquid has a target composition of about 9 to about 13 percent total protein, of which is at least about 90 percent casein (preferably, about 93 to about 95 percent casein) and less than about 10 percent whey (preferably, less than about 5 to about 7 percent whey), about 6 to about 8 percent fat, less than about 1 percent lactose, and about 25 to about 30 percent total solids.

The degree of sterilization or the sterilization value ($F_o$) is based on the time that the dairy product is subjected to specific temperatures and is a culmination of all thermal treatments that the product encounters during processing. Consequently, a desired sterilization value may be achieved through a variety of processing conditions. Typically, concentrated milk is sterilized to a $F_o$ of at least 5 and preferably to a much higher level (e.g., 15 or higher). Unfortunately, as discussed above, high temperatures or long exposures to elevated temperatures, as are generally necessary in conventional sterilization methods to achieve the desired sterilization values, also adversely affect the long term stability of concentrated milk, especially concentrated milk with greater than about 7 percent protein, by inducing gelation or browning.

The sterilization value for a sterilization process can be measured using graphical integration of time-temperature data during the food's slowest heating point rate curve for the thermal process. This graphical integration obtains the total lethality provided to the product. To calculate the processing time required to achieve a desired $F_o$ using the graphical method, a heat penetration curve (i.e., a graphical plot of temperature versus time) at the slowest heating location of the food is required. The heating plots are then subdivided into small time increments and the arithmetic mean temperature for each time increment is calculated and used to determine lethality (L) for each mean temperature using the formula:

$$L=10^{(T-121)/z}$$

Where:
T=arithmetic mean temperature for a small time increment in ° C.;
z=standardized value for the particular microorganism; and
L=lethality of a particular micro-organism at temperature T.

Next, the lethality value calculated above for each small time increment is multiplied by the time increment and then summed to obtain the sterilization value ($F_o$) using the formula:

$$F_o=(t_{T1})(L_1)+(t_{T2})(L_2)+(t_{T3})(L_3)+\ldots$$

Where:
$t_{T1}, t_{T2}, \ldots$ =Time increment at temperature T1, T2, ...;
$L_1, L_2, \ldots$ =Lethality value for time increment 1, time increment 2, ...; and
$F_o$ =Sterilization value at 121° C. of a microorganism.

Consequently, once a penetration curve is generated, the sterilization value $F_o$ for the process can by computed by converting the length of process time at any temperature to an equivalent process time at a reference temperature of 121° C. (250° F.). The calculation of the sterilization value is generally described in Jay, "High Temperature Food Preservation and Characteristics of Thermophilic Microorganisms," in Modern Food Microbiology (D. R. Heldman, ed.), 1998, Ch. 16, New York, Aspen Publishers, which is incorporated herein in its entirety.

For purposes herein, "serum protein" refers to the protein content of milk plasma other than casein (i.e., serum protein refers to whey protein content). "Milk plasma" is the portion of raw milk remaining after removal of the fat content. "Casein" generally encompasses casein per se (i.e., acid casein) or water soluble salts thereof, such as caseinates (e.g., calcium, sodium, or potassium caseinates, and combinations thereof). Casein amounts and percentages described herein are generally reported based on the total amount present of casein and caseinate (excluding the metal cation amount thereof). Casein generally relates to any, or all, of the phosphoproteins in milk, and to mixtures of any of them. An important characteristic of casein is that it forms micelles in naturally occurring milk. Many casein components have been identified, including, but not limited to, $\alpha$-casein (including $\alpha_{s1}$-casein and $\alpha_{s2}$-casein), $\beta$-casein, $\gamma$-casein, $\kappa$-casein, and their genetic variants.

"Reduced fat" milk means about 2 percent fat milk. "Low fat" milk means about 1 percent fat milk. "Fat free milk" or "skim milk" both mean less than about 0.2 percent fat milk. "Whole milk" means not less than about 3.25 percent fat milk, and can be standardized or unstandardized. "Butter milk" means the residual product remaining after milk or cream has been made into butter and contains not less than 3.25 percent fat. "Raw milk" means milk that has not yet been thermally processed. The milk or milk products used can be standardized or non-standardized. The preferred milk is obtained from cows; other mammalian milk suitable for human consumption can be used if desired.

"Shelf-life" or "shelf-stable" generally means the period of time at which a dairy product can be stored at about 70° F. to about 75° F. without developing an objectionable organoleptic characteristic, such as an objectionable aroma, appearance, taste, consistency, or mouthfeel. In addition, an organoleptically acceptable dairy product at a given shelf-life will have no off-odor, off-flavor, or brown coloring, will not have a clumped, ropy, or slippery texture, and will remain ungelled. "Stable" or "shelf-stable" means that the dairy product at a given time does not have objectionable organoleptic characteristics as defined above, is organoleptically acceptable, and does not separate into multiple phases (i.e., fat, cream, serum, and/or sediment) and remains to appear as a homogenous milk-like liquid.

"Total milk solids" or "total solids" refers to the total of the fat and solid-not-fat (SNF) contents. "SNF" refers to the total weight of the protein, lactose, minerals, acids, enzymes, and vitamins.

Essentially any dairy liquid can be used in the present method. Preferably, the dairy liquid originates from any lactating livestock animal whose milk is useful as a source of human food. Such livestock animals include, by way of non-limiting example, cows, buffalos, other ruminates, goats, sheep, and the like. Generally, however, cow's milk is preferred as the starting material. The milk used may be whole milk, reduced-fat milk, low-fat milk, or skim milk.

Cow's milk contains lactose, fat, protein, minerals, and water, as well as smaller amounts of acids, enzymes, gases, and vitamins. Although many factors may affect the composition of raw cow's milk, it generally contains about 11 to about 15 percent total solids, about 2 to about 6 percent milk fat, about 3 to about 4 percent protein, about 4 to about 5 percent lactose, about 0.5 to about 1 percent minerals, and about 85 to about 89 percent water. Although milk contains many types of proteins, they generally can be grouped into the two general categories: casein proteins and whey proteins. The minerals, also known as milk salts or ash, generally include, as the major components, calcium, sodium, potassium, and magnesium; these cations can combine with phosphates, chlorides, and citrates in milk. Milk fat is mostly comprised of triglycerides, and smaller amounts of various other lipids. Lactose or milk sugar (4-O-β-D-galactopyranosyl-D-glucose) is a reducible disaccharide present in raw milk.

Turning to more of the details of the process, the methods herein do not forewarm or otherwise expose the starting dairy liquid to temperatures prior to or during concentration for exposure times that would result in significant cross-linking between casein and whey proteins. In particular, the methods preferably do not expose the starting milk source to temperatures above about 90° C. prior to or during concentration and, in some cases, limit temperature exposure to about 70° C. or lower, and in other cases to about 55° C. or lower prior to and during concentration. While not wishing to be limited by theory, it is believed that by not exposing the starting dairy milk to such temperatures (or such temperatures for only a short time that would not cross-link), the amount of cross-linking between the whey and κ-casein is reduced or, in some cases, eliminated altogether. It is appreciated that the starting dairy liquid may be pasteurized or warmed at temperatures above 90° C. for only a few seconds or minutes (i.e., generally less than about 1 to about 2 minutes), but such temperatures and time exposures are generally not sufficient to cross-link casein to whey in any significant amount.

Cross-linking between the casein and whey proteins can be determined by measuring the amount of pH 4.6 soluble proteins in the liquid. The analysis of pH 4.6 soluble proteins is specific for the quantization of α-lactalbumin and β-lactoglobulin serum proteins. An example of a suitable method to measure the quantity of pH 4.6 soluble proteins is provided in application Ser. No. 11/186,543 and is based on the methodologies published in J. Agric. Food Chem. 1996, 44, 3955-3959 and Int. J. Food Sci. Tech. 2000, 35, 193-200 with modifications to make it amendable to HPLC-mass spectrometry. Sections of these three references relating to quantization of pH 4.6 soluble proteins are incorporated herein by reference. In this case, the liquid prior to and during concentration is expected to have at least about 90 percent or greater pH 4.6 soluble whey proteins, which would indicate that only minimal or substantially no cross-linking between the casein and whey has occurred prior to the whey depletion steps.

Next, concentration of the temperature managed starting dairy liquid is preferably completed by microfiltration techniques with or without diafiltration to deplete whey, lactose, and minerals. It is preferred to concentrate the dairy liquid by at least about 2.7 fold (and preferably by at least about 3 fold, and more preferably by at least about 4 fold) to form a concentrated dairy liquid having (before addbacks) greater than about 9 percent total protein (and preferably about 13 to about 17 percent) and less than about 1 percent lactose to form the whey and lactose depleted concentrated dairy liquid retentate. The solid content of the concentrated dairy liquid retentate will depend, at least in part, on the degree of concentration.

By using microfiltration, a significant amount (generally at least about 40 percent and more preferably at least about 95 percent) of the lactose and minerals are removed during the concentration step. Furthermore, by using microfiltration, the whey is depleted relative to the starting dairy liquid. Generally, the microfiltration removes at least about 80 percent and, more preferably, at least about 90 percent of the whey or serum protein relative to the starting dairy source. The whey and lactose depleted concentrated dairy liquid retentate (before addbacks), therefore, preferably contains at least about 13 to about 17 percent total protein, which contains about 93 to about 95 percent casein protein and about 5 to about 7 percent whey protein, and less than about 1 percent lactose. After concentration, the dairy liquid may optionally be chilled to about ambient temperature (e.g., such as about 20 to about 25° C.).

As noted, the concentration step is carried out using microfiltration techniques, preferably with diafiltration, using a membrane pore size large enough to permit a portion of the whey protein, lactose and minerals to pass through the pores with water as the permeate, while the retentate includes essentially all the casein protein and fat content. For example, milk can be subjected to a membrane separation treatment to separate a casein protein-enriched retentate from a lactose- and whey-enriched permeate. The type of milk processed according to this method is not particularly limited, and includes, for example, whole milk, skim milk, reduced fat milk, low fat milk, butter milk, and combinations thereof.

In one embodiment, membrane filtration procedure parameters used include using conventional microfiltration equipment with ceramic membrane filters with an average pore size of about 0.2 micrometer or less (preferably about 0.1 micrometer), a uniform trans-membrane pressure of about 0.1 to about 0.5 bars, and a processing temperature of about 50 to about 55° C. In one embodiment, whey protein, lactose, and minerals pass through the membrane in an about 50 percent separation ratio, and the retentate comprises about 100 percent of the fat and casein protein provided by the starting dairy source, about 50 percent of lactose, and about 50 percent of free minerals relative to the feed stream. In preferred embodiments, diafiltration is also performed using the same filter and under the same conditions as used for the microfiltration step, except that diluent is fed into the diafiltration system. Preferably, the diafiltration and microfiltration steps are performed in the same system without disruption. Diafiltration serves to keep the lactose concentration in the retentate below 4 percent and the whey protein below about 5 to about 7 percent of the total protein.

After concentration and optional chilling, effective amounts of a stabilizer, a mouthfeel enhancer, and/or flavor may be added to the whey and lactose depleted concentrated dairy liquid retentate in amounts effective so that the resulting concentration remains fluid during sterilization and through an extended shelf life. The stabilizer may be a chaotropic agent, a calcium-binding buffer, or other stabilizer which effectively binds calcium to prevent gelation or separation of the concentrated dairy liquid during storage. While not wishing to be limited by theory and as is detailed in U.S. Pat. No. 7,026,004, it is believed that the calcium-binding stabilizer prevents gelation or separation of the dairy liquid during any storage prior to the subsequent sterilization. Any buffer or chaotropic agent or stabilizer which binds calcium may be used. Examples of calcium-binding buffers, stabilizers, and chaotropic agents include citrate and phosphate buffers, such as disodium phosphate, dipotassium phosphate, disodium citrate, trisodium citrate, EDTA, and the like as well as mixtures thereof. Examples of chaotropic agents include sodium dodecyl sulfate (SDS) and urea. A preferred calcium-binding buffer or stabilizer is disodium phosphate.

Suitable mouthfeel enhancers include sodium chloride, potassium chloride, sodium sulfate, and mixtures thereof. Preferred mouthfeel enhancers include sodium chloride and potassium chloride as well as mixtures thereof; sodium chloride is the most preferred mouthfeel enhancer. Flavors and other additives such as sugar, sweeteners (natural and/or artificial), emulsifiers, fat mimetics, maltodextrin, fibers, starches, gums, and enzyme-treated, cultured, natural, and artificial flavors or flavor extracts can be added so long as they do not significantly and adversely effect either the stability or mouthfeel characteristics.

The effective amounts of the stabilizer and mouthfeel enhancer generally depend on the specific starting dairy liquid, the concentration desired, and the calcium binding capacity of the specific stabilizer used. However, in general, when starting with 2% milk and using microfiltration, about 0.1 to about 1 percent of disodium phosphate, about 0.1 to about 1 percent sodium chloride, about 1 to 10 percent sugar, and about 0.01 to 0.3 percent other flavors can be effective in the present methods when cow's milk is the starting dairy liquid to form a stable and fluid concentrate.

Next, the whey and lactose depleted concentrated dairy liquid retentate with the addbacks is sterilized to form the resultant stable concentrated dairy liquid. Preferably, sterilization is carried out using retorting conditions. Optionally, if the concentrated dairy liquid needs to be diluted to meet a targeted concentration, the dilution should be accomplished prior to sterilization. Preferably, the dairy liquid is packaged, sealed, and then subjected to sterilization temperatures in any suitable equipment. Sterilization is carried out under time and temperature conditions to achieve a $F_o$ of at least 5. Generally, the sterilization process consists of a come-up or heating time, a holding time, and a cool-down time. During the come-up time, a temperature of about 118 to about 145° C. is achieved in about 1 second to about 30 minutes. The temperature is then maintained at about 118 to about 145° for about 1.5 seconds to about 15 minutes. The temperature is then cooled below about 25° C. within about 10 minutes or less. Preferably the sample is gently agitated (e.g., rotating the container) during sterilization to minimize "skin" formation.

The overall treatment (i.e., microfiltration, addition of stabilizers and mouthfeel enhancers, and sterilization) is controlled to produce the final stable concentrated dairy liquid having a total protein content greater than about 9 percent and preferably about 12 to about 13 percent while providing a $F_o$ of at least about 5 and a shelf life of at least about 9 months and preferably at least about 12 months under ambient conditions. Preferably, there is no need to add buffers (such as citrate buffers and the like), mineral binders (such as calcium binders and the like), or other stabilizers prior to the concentration as the temperature management and whey/lactose depletion imparts a sufficient stability to the resultant concentrate without the need for such additional stability enhancers. In addition, there is also preferably no need for secondary concentration (by ultrafiltration, evaporation, microfiltration, or otherwise) of the whey and lactose depleted concentrated retentate as sufficient concentration can be completed using the microfiltration to form a stable concentrate especially when combined with the pre-concentration temperature management.

As mentioned above, the composition of the total protein in the final stable concentrated dairy liquid is at least about 93 to about 95 percent casein protein and generally less than about 5 to about 7 whey protein. As a result, these concentrations typically have a ratio of casein protein to whey protein ranging from about 93:7 to about 95:5. This ratio is in contrast to the starting dairy liquid and prior concentrates that did not deplete whey that have a casein to whey ratio of about 80:20. Generally, the resultant stable concentrated dairy liquids also have a viscosity of about 70 to about 1300 cP and, preferably, about 100 to about 1500 cP at ambient temperatures. (Viscosity measurements using a Brookfield viscometer using spindle No. 27 at 100 rpm at room temperature after 2 minutes of shear.)

Not wishing to be limited by theory, it is believed that by first limiting thermal treatment before reducing or removing the whey protein from the dairy liquid through microfiltration, the cross-linking between the whey protein and the casein micelles will be reduced (and, in some cases, eliminated). Furthermore, again not wishing to be limited by theory, because the concentrated retentate includes depleted amounts of whey proteins, such cross-linking is also reduced (and, preferably, eliminated) at the later sterilization stage. Therefore, it is believed that because the cross-linking bonds between the whey proteins and the κ-casein on the surface of the casein micelle are reduced and generally avoided, the stability of the concentrated product can be enhanced because there is no cross-linked whey protein to dissociate from the casein micelle, which tended to remove the κ-casein with it as generally explained in the background. Rather, it is believed the methods herein form concentrates having intact casein micelles surrounded by the κ-casein proteins (with no or minimal whey cross-linked to the κ-casein). It is believed such structures tend to minimize casein-micelle to casein-micelle interaction, which result in concentrates with enhanced shelf lives over prior concentrates prepared through the prior concentration methods because the κ-casein tended to remain intact with the casein micelle.

As noted above, the concentrated dairy liquid can be homogenized prior to packaging (before or after the addition of addbacks). In general, homogenization may be carried out at any time after the desired dairy composition is prepared and before packaging to help break up and disperse milk fat content, if any, throughout the dairy product to better ensure a smooth, uniform texture. Homogenization, if used, may be performed in one or multiple stages. For instance, in one non-limiting embodiment a first homogenization stage can be performed at about 1,500 psi and a second stage at about 500 psi in an industry standard homogenizer. The homogenate may be cooled if it will not be immediately conducted to a packaging operation. For example, the homogenate may be cooled as it flows through a regeneration and cooling section of a plate heat exchanger of a standard homogenizer. Other homogenization schemes applicable to milk products also may be used.

The packaging technique used is not particularly limited as long as it preserves the integrity of the dairy product sufficient for the applicable shelf life of the dairy product. For example, milk concentrates can be sterilized or retorted in glass bottles or gable-top cartons, and so forth, which are filled, sealed, and the contents are then thermally processed. The dairy products also can be packaged in larger quantities such as in conventional bag-in-box containers or totes. In one embodiment, pre-sterilized bottles or foil-lined gable-top carton materials may be used. Food packaging systems designated as extended shelf life (ESL) or aseptic packaging systems may also be used, but the method and product are not limited thereto. The useful food packaging systems include conventional systems applied or applicable to flowable food products, especially milk products and fruit juices. Preferably the samples are gently agitated (e.g., rotating the container) during sterilization to minimize "skin" formation. The dairy product also may be loaded into and transported in bulk form via tanker trucks or rail car tankers.

The stable concentrated dairy liquid, in a preferred form, is an organoleptically pleasing milk that may be sealed in cartridges or pods to be used in any number of beverage preparation machines. Examples of preferred uses and beverage preparation machines can be found in U.S. patent application Ser. No. 10/763,680, filed Jan. 23, 2004, now U.S. Pat. No. 7,640,834, and owned by the same assignee as the present specification. This just-identified patent application is incorporated herein by reference. The concentration of the milk is beneficial because it allows for larger volumes of the milk to be dispensed from the beverage preparation machines while being able to store a smaller package with less quantity of liquid.

For instance, a cartridge of the concentrated milk may be used to produce an authentic looking frothy milk-based foam desired by consumers in a cappuccino-style beverage. The cartridge of the stable concentrated milk is also suitable for foaming using a low pressure preparation machine and cartridge as described in U.S. patent application Ser. No. 10/763,680 now U.S. Pat. No. 7,640,843, using only pressures below about 2 bar.

In addition, a milk beverage may also be formed using the stable concentrated milk. For example, a beverage may be formed by mixing the stable concentrated milk with a aqueous medium. The milk beverage may also be dispensed from a cartridge containing the stable concentrated milk, also described in U.S. patent application Ser. No. 10/763,680, now U.S. Pat. No. 7,640,843, by passing an aqueous medium through the cartridge to form a beverage by dilution. The concentrated milk may preferably be mixed or diluted with the aqueous medium in a ratio of between about 1:1 to about 6:1.

Figure 3:
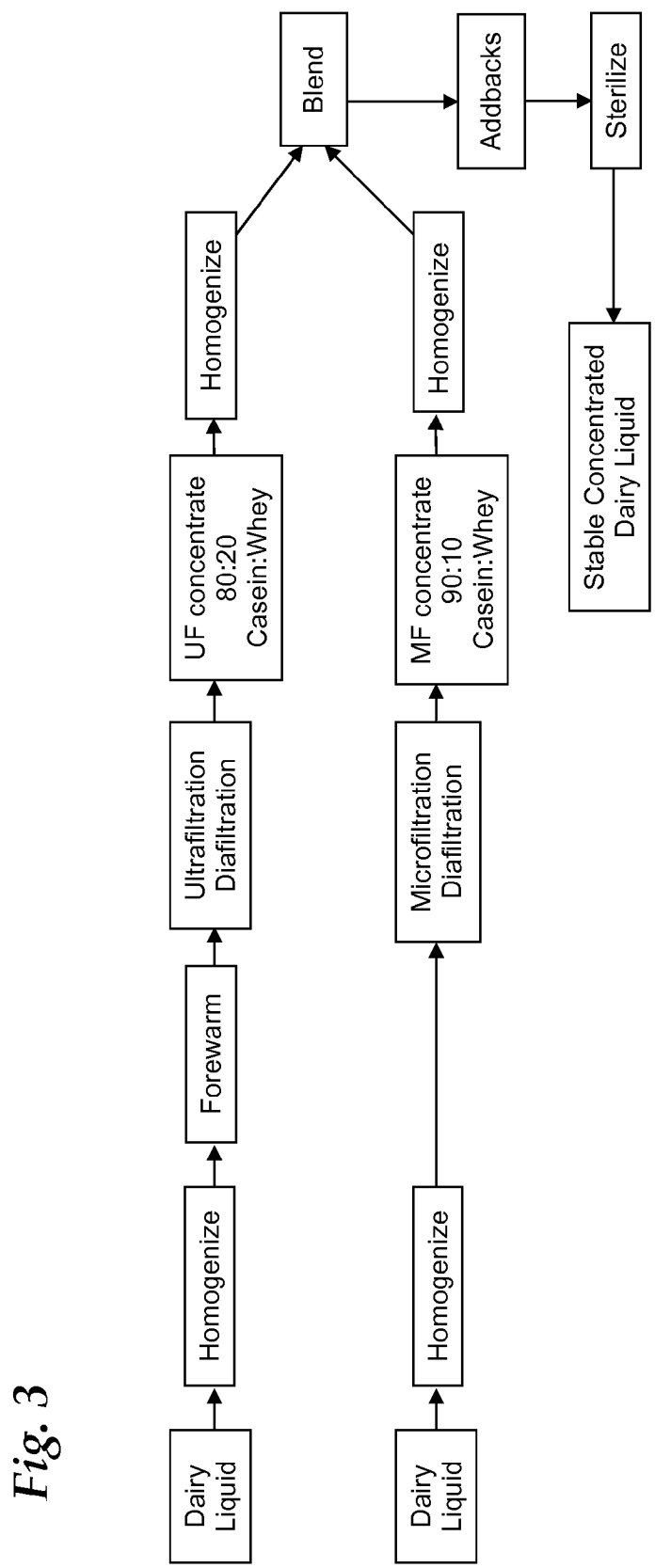
FIG. 3 provides a flowchart illustrating an optional method of preparing concentrated dairy liquids that blends microfiltered and ultrafiltered dairy liquids.

Turning to FIG. 3, an alternative process to produce a stable concentrated dairy liquid is provided. In this process, ultrafiltered and forewarmed milk (having whey cross-linked to casein) is blended with a concentrated dairy liquid subjected to the pre-concentration temperature management and whey/lactose depletion methods described above. This alternative process is advantageous because the amount of whey in the concentrate can be tailored as needed with increased levels of whey, with the additional whey being cross-linked to the casein micelles to improve stability.

By one approach, a second starting dairy liquid is optionally homogenized and then forewarmed to cross-link the whey and casein proteins. For example, the second starting dairy liquid may be forewarmed at a time and temperature effective in reducing pH 4.6 soluble protein by at least about 25 percent, in some cases at least about 50 to about 90 percent, and in other cases, at least about 70 to about 90 percent. Forewarming may be carried out at about 60° C. and, in some cases, at about 70° C. to about 100° C. for about 0.5 to about 20 minute to form the reduction in soluble proteins indicating that the whey and casein are being cross-linked. Next, the dairy liquid is concentrated using ultrafiltration and diafiltration to form a concentrate having a ratio of casein to whey of about 80:20 to about 83:17 with less than about 1 percent lactose. One exemplary process to prepare the ultrafiltered milk is described in US Publication No. 2007/0172548 A1, which is incorporated herein by reference.

The concentrate may then be homogenized and then blended with the whey and lactose depleted concentrated retentate described above. Blends can range from about 25 to about 75 percent microfiltered concentrate with about 25 to about 75 percent ultrafiltered concentrate. Once blended, addbacks as described above can be added, and the liquid can be sterilized to form an alternative stable concentrated dairy liquid.

In addition, advantages and embodiments of the process described herein are further illustrated by the following examples; however, the particular conditions, flow schemes, materials and amounts thereof recited in these examples, as well as other conditions and details, should not be construed to unduly limit this method. All percentages are by weight unless otherwise indicated.

EXAMPLES

Example 1

Concentrated dairy samples were produced to compare the stability of concentrates made per the process of US Publication No. 2007/0172548 A1 ("comparative sample" and "the '548 publication") to concentrates made per the methods disclosed herein ("inventive" or "whey-depleted sample") upon being subjected to an extended shelf life.

The comparative sample was produced using the process of the '548 publication to form a 3.3× milk concentrate. The comparative sample was prepared by first homogenizing 2 percent raw milk at 500 psi, forewarming the homogenized milk at about 90° C. for about 300 seconds, and then concentrating the forewarmed milk at about 50 to about 55° C. using ultrafiltration with diafiltration using a hollow fiber membrane with a 10,000 kDa molecular weight cut off. Concentration was performed until a total solids of about 25 percent was achieved. Diafiltration water was used to reduce the lactose content in the concentrate to below about 1 percent. After concentration, a second homogenization step was conducted at 1500/150 psi. After homogenization, about 4.5 percent sucrose, about 0.25 percent trisodium citrate, and 0.4 percent sodium chloride were combined with about 69.3 percent concentrate and about 25.5 water to form the final comparative concentrate, which was then sterilized at retort conditions with a temperature between about 118 and 145° C. achieved in about 1 second to about 30 minutes, maintaining the temperature for about 1.5 seconds to about 15 minutes, and then cooling the sample to room temperature in about 10 minutes or less.

The whey-depleted sample was prepared by first homogenizing 2 percent pasteurized milk at 1500/500 psi, concentrating the homogenized milk using microfiltration with diafiltration using a ceramic membrane with a 0.1 micrometer pore size. Concentration was performed until a total solids of about 31 percent was obtained. Diafiltration was used to reduce the lactose content in the concentrate to below about 1 percent. After concentration, a second homogenization step was conducted at about 4000/500 psi. After this second homogenization, about 54.3 percent concentrate, 40.5 percent water, about 4.5 percent sucrose, about 0.25 percent trisodium citrate, and about 0.4 percent sodium chloride were combined to form the final concentrate, which was sterilized under the same conditions described above. The slightly different amounts of concentrate and water added to the whey-depleted sample accounted for the differences in percent solids after concentration so that the final concentrate has a similar composition as the comparative sample.

Both final concentrate samples contained a similar composition in terms of fat, total protein, mineral, and lactose levels as provided in Table 1 below. While both samples had a similar total protein content, the samples made by the methods described herein (i.e., the whey-depleted sample) had substantially less whey proteins (i.e., about 73 percent less whey protein than the comparative sample). Samples were then stored undisturbed for about 8 months at about 70 to about 75° F. before visual observation.

TABLE 1

Concentrate Composition

|  | Inventive Whey-Depleted Sample | Comparative Sample |
|---|---|---|
| Total Solids | 22.5% | 22.5% |
| Total Protein | 9.5% | 9.5% |
| Fat | 6.2% | 6.2% |
| Lactose | <1% | <1% |
| Casein | 9% | 7.6% |
| Whey | 0.5% | 1.9% |
| Observation after 8 Months Storage | Fluid | Three Distinct Phases |

After about 8 months, the comparative sample in the formulation and conditions of this study displayed three distinct phases. A cream layer had risen to the top of the samples while a gelatinous precipitate layer had settled to the bottom. In addition, an opaque aqueous layer could be seen between the cream and precipitate layer. In contrast, the whey-depleted sample produced using the process described herein appeared as a continuous single phase with no visual cream or aqueous layer. Upon further observation it was noted that a small, insignificant amount of sample had precipitated, but overall was substantially continuous and fluid.

Similar samples were constructed to compare the effect of higher-fold milk solids and the alternate adjunct, disodium phosphate. These samples were also prepared using the same methods described above to prepare the concentrates as described in Table 2 below. After about 8 months of storage at about 70 to about 75° F. the higher solids comparative sample produced in the formulation and conditions of this study contained both a sediment and a thin water layer (no cream layer visible) while the higher-solids, whey-depleted sample produced using the process described herein was very homogenous without any phase separation. In the comparative sample, about 91.8 percent concentrate, about 1.3 percent water, about 6.0 percent sucrose, about 0.33 percent disodium phosphate, and about 0.55 sodium chloride were combined. For the Inventive, whey-depleted sample, about 72.1 percent concentrate, about 21.1 percent water, about 6.0 percent sucrose, about 0.33 percent disodium phosphate, and about 0.55 sodium chloride were combined. Again, differences were due to total solids of the concentrates after concentration in order to target a final concentrate with similar compositions as shown below.

TABLE 2

Higher Solids Concentrate Compositions

|  | Inventive Whey Depleted Sample | Comparative Sample |
|---|---|---|
| Total Solids | 30% | 30% |
| Total Protein | 12.7% | 12.7% |
| Fat | 8.2% | 8.2% |
| Lactose | <1% | <1% |
| Casein | 12.1% | 10.2% |
| Whey | 0.6% | 2.5% |
| Observation after 8 Months Storage | Homogeneous and Fluid | Sediment and water layer |

Example 2

Samples were produced to blend concentrated 2 percent milk produced from either the process of the '548 publication (i.e., the ultrafiltration or UF samples) or the whey and lactose depletion process described herein (i.e., the microfiltration or MF sample) to determine the effect on sterilization stability by varying the amount of whey in the final concentrates by blending UF and MF samples. As the UF samples were made per the process of the '548 publication including the use of forewarming, they had at least about 70 percent of its whey cross-linked to the casein.

Final samples were produced at ratios of 100% UF (comparative) and 100 MF retentates and blends of UF and MF samples including 75% UF: 25% MF; 50% UF: 50% MF; and 25% UF: 75% MF as generally provided in FIG. 3. About 6 percent sucrose, about 0.55 percent sodium chloride, and about 0.33 percent disodium phosphate were added to each sample prior to sterilization (unless indicated otherwise). All samples were fluid in nature post sterilization with increasing viscosities associated with samples containing a higher percentage of microfiltration concentrated milk. A comparison of normalized viscosity values (viscosity divided by the total solids of the sample) showed a higher value for concentrate produced using microfiltration versus ultrafiltration, but otherwise were acceptable.

TABLE 3

Post Sterilization Analysis

|  | Post-Retort Viscosity (cP) | Total Solids (%) | Normalized Viscosity (Viscosity/Total Solids) | Total Protein (%) | Casein (%) | Whey (%) | Sucrose (%) | NaCl (%) | DSP (%) |
|---|---|---|---|---|---|---|---|---|---|
| 100% UF (Control) | 57.5 | 29.43 | 1.95 | 12 | 80 | 20 | 6 | 0.55 | 0.33 |
| 75%:25% (UF:MF) | 77.5 | 30.67 | 2.53 | 13.1 | 83.8 | 16.2 | 6 | 0.55 | 0.33 |
| 50%:50% (UF:MF) | 190.5 | 32.3 | 5.90 | 13.7 | 87.5 | 12.5 | 6 | 0.55 | 0.33 |
| 25%:75% (UF:MF) | 487.5 | 33.79 | 14.43 | 14.3 | 91.2 | 8.8 | 6 | 0.55 | 0.33 |
| 100% MF | 1240 | 35.11 | 35.32 | 14.9 | 95 | 5 | 6 | 0.55 | 0.33 |
| 100% MF (no adj) | 477.5 | 30.22 | 15.80 | 15.9 | 95 | 5 | 0 | 0 | 0 |
| 100% UF (no adj) (Control) | 32.5 | 24.22 | 1.34 | 13.5 | 80 | 20 | 0 | 0 | 0 |

After about 7 months of storage at ambient temperatures (about 70 to about 75° F.), the results were as provided in Table 4 below. Since total solids of the tested samples were not normalized, some samples had higher total solids and, as a result, tended to form concentrates not fluid after shelf storage.

TABLE 4

Observations After About 7 Months Storage

|  | Visual Observation | pH | Viscosity (cP) | Comments |
| --- | --- | --- | --- | --- |
| 100% UF (Control) | very fluid | 6.23 | 130 | |
| 75%:25% (UF:MF) | very fluid | 6.28 | 157.5 | |
| 50%:50% (UF:MF) | very fluid | 6.26 | 357.5 | |
| 25%:75% (UF:MF) | thick but fluid | 6.26 | 975 | High Total Solids Sample |
| 100% MF | barely pourable even after shaking | 6.27 | 2200 | High Total Solids Sample |
| 100% MF (no adj) | not pourable even after shaking | 6.74 | 2128 | |
| 100% UF (no adj) (Control) | very fluid | 6.85 | 127.5 | |

It will be understood that various changes in the details, materials, and arrangements of the process, formulations, and ingredients thereof, which have been herein described and illustrated in order to explain the nature of the method and resulting concentrate, may be made by those skilled in the art within the principle and scope of the embodied method as expressed in the appended claims.

What is claimed is:

1. A method of making a stable concentrated dairy liquid, the method comprising:
   providing a starting dairy liquid containing lactose and dairy protein with casein protein and whey protein;
   concentrating the casein protein and depleting the whey protein and lactose from the starting dairy liquid to form a whey and lactose depleted concentrated dairy liquid with a ratio of the casein protein to the whey protein of at least about 90:10 and less than about 1 percent lactose;
   maintaining the starting dairy liquid prior to and during the concentrating step at or below about 90° C. so that substantially no cross-linking occurs between the casein protein and the whey protein so that the starting dairy liquid has at least about 90 percent pH 4.6 soluble proteins;
   adding a stabilizer and a mouthfeel enhancer to the whey and lactose depleted concentrated dairy liquid to form an intermediate concentrated dairy liquid;
   sterilizing the intermediate concentrated dairy liquid at a temperature and for a time sufficient to obtain the stable concentrated dairy liquid having a $F_o$ of at least 5; and
   the stable concentrated dairy liquid has a total solids from about 25 to about 30 percent, about 9 to about 13 percent total protein of which is at least about 90 percent casein protein and less than about 10 percent whey protein, and less than about 1 percent lactose; and
   wherein the intermediate concentrated dairy liquid is resistant to gelation during sterilization, and wherein the stable concentrated dairy liquid is resistant to gelation for at least about 9 months of storage under ambient conditions.

2. The method of claim 1, wherein the total protein of the stable concentrated dairy liquid includes about 93 to about 95 percent casein protein and about 5 to about 7 percent whey protein.

3. The method of claim 1, wherein the temperature is below about 70° C.

4. The method of claim 1, wherein the temperature is below about 55° C.

5. The method of claim 1, wherein the total protein in the stable concentrated dairy liquid includes about 93 to about 95 percent casein protein and about 5 to about 7 percent whey protein.

6. The method of claim 1, wherein the stable concentrated dairy liquid includes about 0.2 to about 0.4 percent of the stabilizer selected from the group consisting of disodium phosphate, dipotassium phosphate, disodium citrate, trisodium citrate, and mixtures thereof.

7. The method of claim 6, wherein the stabilizer is disodium phosphate.

8. The method of claim 1, wherein the stable concentrated dairy liquid includes about 0.4 to about 0.6 percent of the mouthfeel enhancer selected from the group consisting of sodium chloride, potassium chloride, sodium sulfate, and mixtures thereof.

9. The method of claim 1, wherein the stable concentrated dairy liquid contains about 0.2 to about 0.4 percent of disodium phosphate, about 0.4 to about 0.6 percent sodium chloride, and about 4.5 to about 6 percent sweetener.

10. The method of claim 1, wherein the concentrating step is microfiltration with diafiltration to form a whey and lactose depleted concentrated dairy liquid retentate.

11. The method of claim 1, further comprising providing a second starting dairy liquid having casein proteins and whey proteins, forewarming the second starting dairy liquid sufficient to effect a reduction in pH 4.6 soluble proteins, concentrating the second starting dairy liquid using ultrafiltration to form a second concentrated dairy liquid retentate, the second concentrated dairy liquid retentate having an increased amount of the casein proteins and the whey proteins relative to the second starting dairy liquid, and blending the second concentrated dairy liquid retentate with the whey and lactose depleted concentrated dairy liquid.

12. The method of claim 11, wherein the second concentrated dairy liquid retentate includes an amount of dairy protein with about 80 to about 83 percent casein protein and about 17 to about 20 percent whey protein.

13. The method of claim 11, wherein the second concentrated dairy liquid retentate has at least about 70 percent of the whey protein cross-linked with the casein protein as determined by pH 4.6 soluble protein.

14. A whey and lactose depleted concentrated dairy liquid comprising:
   about 25 to about 30 percent total solids;
   about 9 to about 13 percent total dairy protein, which includes at least about 90 percent casein protein and less than about 10 percent whey protein, the total dairy protein being supplied from a dairy source exposed to a temperature prior to and during concentration not to exceed about 90° C. such that substantially no cross-linking occurs between the casein protein and the whey protein so that at least about 90 percent pH 4.6 soluble proteins is present prior to being concentrated;
   less than about 1 percent lactose; and
   at least one stabilizer and at least one mouthfeel enhancer in amounts sufficient so that the whey and lactose depleted concentrated dairy liquid remains shelf-stable during sterilization and for at least about 9 months of storage at about 70 to about 75° F.

15. The whey and lactose depleted concentrated dairy liquid of claim 14, wherein the total dairy protein contains at least about 95 percent casein protein and less than about 5 percent whey protein.

16. The whey and lactose depleted concentrated dairy liquid of claim 14, comprising about 8 to about 12 percent casein protein and about 1 percent or less whey protein.

17. The whey and lactose depleted concentrated dairy liquid of claim 14, wherein the whey and lactose depleted concentrated dairy liquid includes about 0.2 to about 0.4 percent of the stabilizer selected from the group consisting of disodium phosphate, dipotassium phosphate, disodium citrate, trisodium citrate, and mixtures thereof.

18. The whey and lactose depleted concentrated dairy liquid of claim 14, wherein the stable concentrated dairy liquid includes about 0.4 to about 0.6 percent of the mouthfeel enhancer selected from the group consisting of sodium chloride, potassium chloride, sodium sulfate, and mixtures thereof.

\* \* \* \* \*